US010021068B2

(12) United States Patent
Li

(10) Patent No.: US 10,021,068 B2
(45) Date of Patent: *Jul. 10, 2018

(54) METHOD, SYSTEM AND APPARATUS FOR KEEPING SESSION TABLE ALIVE IN NET ADDRESS TRANSLATION APPARATUS

(71) Applicant: Huawei Technologies Co., Ltd., Shenzhen (CN)

(72) Inventor: Wei Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 261 days.

This patent is subject to a terminal disclaimer.

(21) Appl. No.: 14/854,995

(22) Filed: Sep. 15, 2015

(65) Prior Publication Data

US 2016/0006689 A1 Jan. 7, 2016

Related U.S. Application Data

(63) Continuation of application No. 12/410,990, filed on Mar. 25, 2009, now Pat. No. 9,166,948, which is a (Continued)

(30) Foreign Application Priority Data

Oct. 10, 2006 (CN) .......................... 2006 1 0140776

(51) Int. Cl.
*H04L 29/12* (2006.01)
*H04L 29/06* (2006.01)
*H04L 12/751* (2013.01)

(52) U.S. Cl.
CPC .... *H04L 61/2553* (2013.01); *H04L 29/12471* (2013.01); *H04L 45/026* (2013.01); *H04L 61/2564* (2013.01); *H04L 65/1016* (2013.01)

(58) Field of Classification Search
CPC ................................................. H04L 29/12471
See application file for complete search history.

(56) References Cited

U.S. PATENT DOCUMENTS 6,856,991 B1 2/2005 Srivastava
7,305,481 B2 12/2007 Blanchet et al.
(Continued)

FOREIGN PATENT DOCUMENTS

CN 1728681 A 2/2006
CN 1946062 A 4/2007
(Continued)

OTHER PUBLICATIONS

Border Gateway Protocol (BGP), Jun. 1999, Internetworking Technology Overview, Chapter 35, pp. 1-8.*

(Continued)

*Primary Examiner* — Douglas B Blair
(74) *Attorney, Agent, or Firm* — Brinks Gilson & Lione

(57) ABSTRACT

Embodiments of the disclosure provide a method for keeping a session table alive in a Network Address Translation, NAT, apparatus, including: creating a hello session table by an Access Border Gateway Function, A_BGF, apparatus; creating a hello message by the A_BGF apparatus according to the hello session table; sending the hello message by the A_BGF apparatus to the NAT apparatus; receiving the hello message by the NAT apparatus; and updating a session table corresponding to the hello message by the NAT apparatus. Embodiments of the disclosure also provide a system and apparatus for keeping a session table alive in an NAT apparatus. Application of the embodiments of the disclosure keeps the session table alive in the NAT apparatus of an IP Multimedia Subsystem, IMS, ensures an unblocked registration path, and prevents the user conversation being interrupted due to an aged session table of the NAT apparatus.

15 Claims, 3 Drawing Sheets

Related U.S. Application Data continuation of application No. PCT/CN2007/070149, filed on Jun. 21, 2007.

(56) References Cited

U.S. PATENT DOCUMENTS

| | | | |
|---|---|---|---|
| 7,483,437 B1 * | 1/2009 | Mohaban | H04L 63/029 370/400 |
| 7,881,215 B1 | 2/2011 | Daigle et al. | |
| 8,191,116 B1 * | 5/2012 | Gazzard | H04W 12/06 726/10 |
| 9,166,948 B2 * | 10/2015 | Li | H04L 29/12471 |
| 2002/0054587 A1 | 5/2002 | Baker et al. | |
| 2003/0009561 A1 * | 1/2003 | Sollee | H04L 29/06 709/227 |
| 2003/0084161 A1 | 5/2003 | Watson et al. | |
| 2003/0084162 A1 | 5/2003 | Johnson et al. | |
| 2005/0074000 A1 | 4/2005 | Yokoyama et al. | |
| 2006/0029083 A1 | 2/2006 | Kettlewell et al. | |
| 2007/0058617 A1 | 3/2007 | Stiemerling et al. | |
| 2007/0094412 A1 | 4/2007 | Sollee | |
| 2007/0291658 A1 * | 12/2007 | Knapik | H04L 43/10 370/252 |
| 2008/0212778 A1 | 9/2008 | Kaneko et al. | |
| 2009/0182829 A1 | 7/2009 | Li | |

FOREIGN PATENT DOCUMENTS

| | | |
|---|---|---|
| WO | WO 02/103981 A2 | 12/2002 |
| WO | WO 2005/125082 A1 | 12/2005 |

OTHER PUBLICATIONS

P-CSCF Suport, date unkown, Cisco Unified Border Element (SP Edition) Configuration Guide: Unified Model.*

* cited by examiner

METHOD, SYSTEM AND APPARATUS FOR KEEPING SESSION TABLE ALIVE IN NET ADDRESS TRANSLATION APPARATUS

CROSS REFERENCE

This application is a continuation of U.S. patent application Ser. No. 12/410,990, filed on Mar. 25, 2009, which is a continuation of International Application No. PCT/CN2007/070149, filed on Jun. 21, 2007, which claims priority to Chinese Patent Application No. 200610140776.9, filed on Oct. 10, 2006, The afore-mentioned patent applications are hereby incorporated by reference in their entireties.

FIELD OF THE TECHNOLOGY

The disclosure relates to communication technologies, and particularly, to a method, system and apparatus for keeping a session table alive in a net address translation apparatus.

BACKGROUND OF THE INVENTION

An IP Multimedia Subsystem (IMS) is a system which supports IP multimedia services, and is proposed by the 3G mobile network with support of the 3rd Generation Partnership Project (3GPP). The IMS is related to services and applications, and enables telecommunication companies, mobile network operators and other service providers to provide a rich variety of multimedia services via a next generation packet switch network. At present, the IMS has been extended to cable networks, and becomes a key technique in fixed networks and mobile networks.

The IMS is based on a Session Initiation Protocol (SIP). The SIP is a key technique in the communication control of the Next Generation Network (NGN) based on the IP. Referring to FIG. 1, an IP network telephone using the SIP under a private network is taken as an example to describe the structure of a conventional IMS system networking. A User Equipment (UE) of the IP network telephone under the private network is registered on a Proxy-Call Session Control Function (P_CSCF) via a Network Address Translation (NAT), an Access Border Gateway Function (A_BGF) and other apparatuses. A registration path acquired by the UE after a successful registration is: UE-NAT-A_BGF-P_CSCF. SIP signalings are forwarded by the registration path.

A plurality of entries for stream forwarding, i.e. session tables, is stored in such stream forwarding apparatuses as the NAT and the A_BGF. When a message is forwarded, a session table is obtained first by searching according to a key value which includes a source IP address, a destination IP address, a source port, a destination port, and a protocol number. After the session table is found, i.e. the session table is hit, an outbound interface index is obtained by searching in a fast Forwarding Information Base (FIB) entry according to the destination IP address in the session table, a next hop information is obtained by searching in a routing table, and a destination Media Access Control (MAC) address is obtained by searching in an Address Resolution Protocol (ARP) entry. The message is forwarded according to the destination IP address, the outbound interface index, the next hop information, and the destination MAC address.

An aging_time and a time_stamp are included in the session table. The aging_time denotes a time when that the session table is aged. The time_stamp is a time counter, and counts from 0 when the session table is created. When the value of the time_stamp is greater than that of the aging_time, i.e., the entry has been aged, erase the session table.

Since the NAT, the A_BGF and the like all are steam forwarding apparatuses, the registration path of the UE is unique. Throughout the user's conversation duration, the session tables in the A_BGF and the NAT have to be kept alive to ensure that the registration path is unblocked. In the IMS system, since the P_CSCF periodically sends a command for keeping session table alive to the A_BGF, the session table in the A_BGF is kept alive. Throughout the user's conversation duration, the session table in the NAT apparatus has to be kept alive to ensure that the registration path is unblocked.

At present, when the IMS technique is used, there are two methods for keeping the session table alive in the NAT apparatus, and an IP network telephone under a private network is taken as an example.

A UE of the IP network telephone under the private network sends a re-registration message to a P_CSCF via the NAT apparatus. After a session table in the NAT apparatus is hit by the re-registration message, the NAT apparatus refreshes the time_stamp in the session table to prevent the session table from being aged during the conversation, thus keeping the registration path unblocked.

However, the time when the UE of the IP network telephone sends the re-registration message is set by the manufacturer of the UE, and varies with the manufacturer who configures the time. In addition, the time when a product sends the re-registration varies with the performance of the product. Since the time when the UE of the IP network telephone sends the re-registration message cannot be set flexibly, it is quite possible that the session table of the NAT apparatus has already been aged before the UE sends such a message.

Therefore, it is necessary to prolong the life of the session table, i.e., make the aging_time of the session table in the NAT apparatus longer than the user's conversation duration, thus keeping the registration path unblocked.

However, on the one hand, since there is a considerable difference between the conversation durations of the users, it is difficult to determine the value of the aging_time, and it cannot be ensured that the prolonged aging_time in the session table is definitely longer than the conversation durations of the users. On the other hand, over-prolonging the aging_time in a session table will inevitably affect the performance of the NAT apparatus.

SUMMARY OF THE INVENTION

The embodiments of the disclosure provide a method, system and apparatus for keeping a session table alive in an NAT apparatus, which prevents the session table in the NAT apparatus from being aged, thus ensuring an unblocked registration path of a UE.

A method for keeping a session table alive in an NAT apparatus includes:
creating a hello message by an A_BGF apparatus according to a created hello session table;
creating a hello session table by an Access Border Gateway Function, A_BGF, apparatus;
sending the hello message by the A_BGF apparatus to the NAT apparatus; receiving the hello message by the NAT apparatus; and updating a session table corresponding to the hello message by the NAT apparatus.

A system for keeping a session table alive in a Network Address Translation, NAT, apparatus includes:

an Access Border Gateway Function, A_BGF, apparatus, adapted to creating a hello session table; creating a hello message according to the hello session table, and sending the hello message; and a Network Address Translation, NAT, apparatus, adapted to receiving the hello message and updating a session table corresponding to the hello message.

An Access Border Gateway Function, A_BGF, apparatus, includes: an entry management module, for creating a hello session table or updating a created hello session;

a message creating module, for creating a hello message according to the hello session table; and a transmitting module, for sending the hello message to the NAT apparatus.

A Network Address Translation, NAT, apparatus, includes:

a receiving module, for receiving a hello message from an Access Border Gateway Function, A_BGF, apparatus; and an updater module, for updating a session table corresponding to the hello message.

It can be seen from the solution provided by the embodiments of the disclosure that, an A_BGF sends a hello message via an NAT apparatus, which enables an session table corresponding to the hello message to be timely kept alive, ensures that a registration path is unblocked in an IMS system, and prevents the user's conversation from being interrupted caused by an aged session table in the NAT apparatus.

In addition, in the embodiments of the disclosure, the A_BGF keeps the session table alive in the NAT apparatus by sending a hello message, and it is unnecessary for a UE to send a re-registration message or to prolong the aging_time in the session table, thereby keeping the session table alive in the NAT apparatus without affecting the performance of the NAT apparatus.

DETAILED DESCRIPTION OF THE INVENTION

A further description of the disclosure is given as follows with reference to embodiments and the accompanying drawings, which, however, is not for use in limiting the protection scope of the disclosure.

In embodiments of the disclosure, an A_BGF apparatus first creates a hello message, i.e., a message for keeping sessions alive according to a hello session table created, and sends the hello message to a UE via an NAT apparatus. The NAT apparatus, after receiving the hello message, updates a session table corresponding to the hello message in the NAT apparatus according to the hello message, thus keeping the session table alive in the NAT apparatus.

Figure 1:
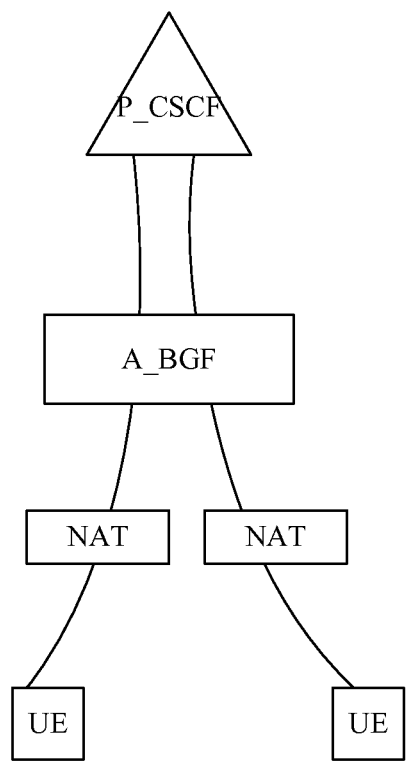
FIG. 1 is a schematic diagram illustrating a structure of a conventional IMS system networking.
Figure 2:
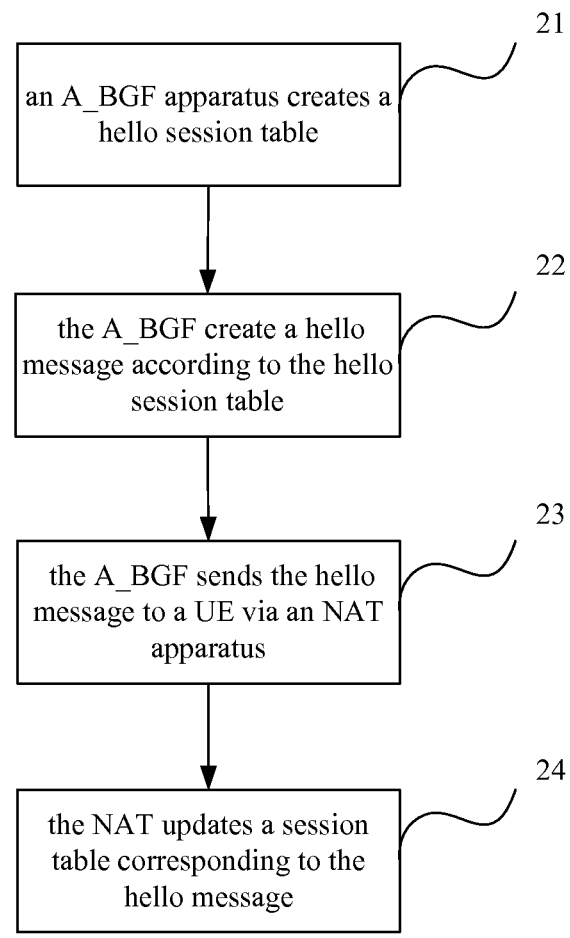
FIG. 2 is a flowchart illustrating a method for keeping a session table alive in an NAT apparatus in an embodiment of the disclosure.

FIG. 2 is a flowchart illustrating a method for keeping a session table alive in an NAT apparatus in an embodiment of the disclosure. In this embodiment, an A_BGF sends a hello message to a UE of the IP network telephone under a private network via an NAT. The method includes the following steps.

At step 21, an A_BGF apparatus creates a hello session table.

The A_BGF apparatus first modifies a source port number in an existing key value to create a key for keeping session table alive, and then creates the hello session table according to the key for keeping session table alive.

A P_CSCF periodically sends a command for keeping session table alive to the A_BGF apparatus, thus keeping a session table alive in the A_BGF apparatus. For the purpose of enabling the A_BGF apparatus to keep a session table alive in an NAT apparatus, a key value in the command for keeping session table alive is used as the existing key value to create the hello session table.

After receiving the command for keeping session table alive, the A_BGF apparatus creates the key for keeping session table alive according to the key value in the command for keeping session table alive. Since a source port number of the key value in the original session table is surely not 0, for the purpose of differentiating the key value of the original session table in the A_BGF apparatus from the key for keeping session table alive, the source port number of the key value in the command for keeping session table alive is set as 0, and the other values such as the IP address, the destination IP address, the destination port and the protocol number are kept unchanged, thus creating the key for keeping session table alive.

The hello session table is created according to the key for keeping session table alive. The key value in the original session table in the A_BGF apparatus is different from the key for keeping session table alive, thus enabling the hello session table to be differentiated from the original session table in the A_BGF apparatus. When the hello session table is created, the downlink apparatus address in the hello session table is set exactly as the downlink apparatus address in the session table corresponding to the existing key value. For example, when the downlink apparatus is a UE, the downlink apparatus address in the hello session table is the address of the UE; when the downlink apparatus is an NAT apparatus, the downlink apparatus address in the hello session table is the address of the NAT apparatus.

If the hello session table corresponding to the key for keeping session table alive has been created in the A_BGF apparatus, the A_BGF apparatus updates the created hello session table, and sets the time_stamp in the hello session table created as 0 so as to keep the created hello session alive.

At step 22, a hello message is created according to the hello session table.

The A_BGF apparatus first obtains an outbound interface index by searching in a corresponding FIB entry according to the downlink apparatus address in the hello session table, obtains a next hop information by searching in the corresponding routing table, obtains a destination MAC address by searching in the corresponding ARP entry, and then constructs the hello message according to the above obtained information, such as the outbound interface index, the next hop and the destination MAC address, sets the downlink apparatus address in the hello message as the downlink apparatus address in the hello session table.

At step 23, the A_BGF apparatus sends the hello message to a UE via an NAT apparatus.

The A_BGF apparatus scans all the session tables, and when a session table with a source port number being as 0 in the key value, i.e. a hello session table, is scanned, sends a hello message corresponding to the hello session table to a downlink apparatus according to the downlink apparatus address in the hello session table via the NAT apparatus.

The A_BGF apparatus may send the hello message to the UE on a regular basis, i.e., the A_BGF apparatus scans all the session tables periodically. If a hello session table is scanned, then a hello message is created according to the hello session table, and the A_BGF apparatus sends the hello message to the UE. A timer may be provided in the A_BGF apparatus for implementation, and the time when the hello message is periodically sent is designated in advance in the A_BGF apparatus as required in practice.

At step 24, the NAT apparatus updates a session table corresponding to the hello message.

After receiving the hello message, the NAT apparatus searches for a session table corresponding to the hello message. After the session table is hit, the NAT apparatus updates the time_stamp in the session table, such as setting the time_stamp as 0, thus keeping the session table alive in the NAT apparatus.

In addition, the A_BGF apparatus periodically updates and maintains the hello session table, i.e., periodically scans the hello session table. When the current time_stamp in the hello session table is longer than the aging_time, which indicated that the hello session table has been aged, erases the hello session table.

Figure 3:
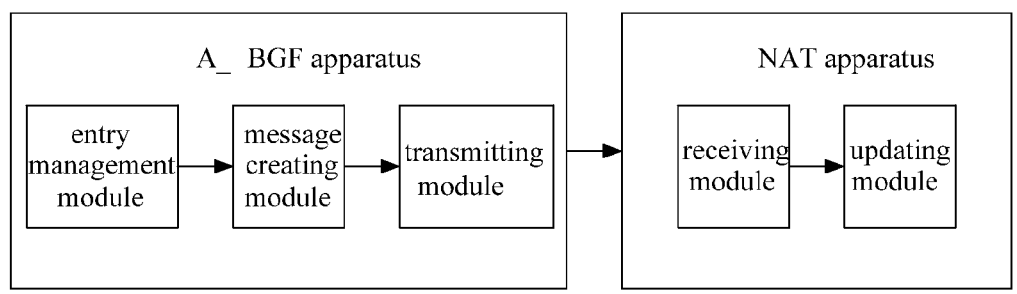
FIG. 3 is a schematic diagram illustrating a structure of the system for keeping a session table alive in an NAT apparatus in an embodiment of the disclosure.

FIG. 3 illustrates a structure of the system for keeping a session table alive in an NAT apparatus in an embodiment of the disclosure. In this embodiment, the system includes an A_BGF apparatus and an NAT apparatus.

The A_BGF apparatus is adapted for creating a hello message according to a created hello session table, and sending the hello message to a UE via an NAT apparatus.

The NAT apparatus is adapted for updating a session table corresponding to the hello message according to the hello message.

In this embodiment, the A_BGF apparatus further includes an entry management module, a message creating module and a transmitting module.

The entry management module is adapted for creating a hello session table, or updating a created hello session table; the message creating module is adapted for creating a hello message according to the hello session table; the transmitting module is adapted for sending the hello message to the UE via the NAT apparatus.

The NAT apparatus further includes a receiving module and an updating module.

The receiving module is adapted for receiving the hello message. The updating module is adapted for updating and keeping alive the session table corresponding to the hello message according to the hello message.

The entry management module in the A_BGF apparatus includes a key value creating unit, an entry creating unit and an entry updating unit.

The key value creating unit is adapted for creating a key for keeping the session table alive by modifying a source port number in an existing key value.

The entry creating unit is adapted for creating a hello session table corresponding to the key for keeping the session table alive according to the key for keeping session table alive, the downlink apparatus address in the hello session table being the same as the downlink apparatus address in the session table corresponding to the existing key value.

The entry updating unit is adapted for updating the created hello session table corresponding to the key for keeping session table alive according to the key for keeping session table alive.

When the A_BGF apparatus periodically sends the hello message, the transmitting module is specifically a periodical transmission module for periodically sending the hello message to the UE via the NAT apparatus.

The A_BGF apparatus also includes a refreshing module for periodically refreshing the hello session table and erase the hello session table when the hello session table has been aged.

The foregoing is only one of the preferred embodiments of the disclosure. The protection scope of the disclosure, however, is not limited to the above description. Any change or substitution, within the technical scope disclosed by the disclosure, easily occurring to those skilled in the art should be covered by the protection scope of the disclosure.

The invention claimed is:

1. A method for keeping a session table alive in a Network Address Translation, NAT, apparatus, comprising:
    receiving a command for keeping a session table alive from a proxy call session control function (P_CSCF) by an Access Border Gateway Function (A_BGF) apparatus;
    creating a hello session table by the A_BGF apparatus according to the command;
    creating a hello message by the A_BGF apparatus according to the hello session table;
    sending the hello message by the A_BGF apparatus to the NAT apparatus;
    receiving the hello message by the NAT apparatus; and
    updating a session table corresponding to the hello message received by the NAT apparatus.

2. The method of claim 1, wherein creating the hello session table comprises:
    creating a key for keeping session table alive by modifying a source port number in an existing key value; and
    creating the hello session table according to the key for keeping session table alive, wherein a downlink apparatus address in the hello session table is the same as a downlink apparatus address in a session table corresponding to the existing key value.

3. The method of claim 1, further comprising: updating the hello session table by the A_BGF apparatus, wherein updating the hello session table comprises,
    creating a key for keeping session table alive by modifying a source port number in an existing key value; and
    updating the hello session table according to the key for keeping session table alive.

4. The method of claim 3, wherein the existing key value comprises a key value acquired by the A_BGF apparatus from a command for keeping session table alive sent from a Proxy-Call Session Control Function, P_CSCF, apparatus.

5. The method of claim 1, wherein creating the hello message comprise:
    obtaining an outbound interface index by searching in a fast Forwarding Information Base, FIB, entry according to a destination IP address in the hello session table;
    obtaining a next hop information by searching in a routing table;
    obtaining a destination Media Access Control, MAC, address by searching in a Address Resolution Protocol, ARP, entry; and creating the hello message according to the destination IP address, the outbound interface index, the next hop information, and the destination MAC address.

6. The method of claim 1, wherein sending the hello message comprises:
sending the hello message periodically by the A_BGF apparatus.

7. The method of claim 1, wherein updating the session table by the NAT apparatus comprises:
finding the session table corresponding to the hello message; and
updating a time stamp in the session table.

8. The method of claim 1, further comprising:
updating the hello session table periodically by the A_BGF apparatus and erasing the hello session table by the A_BGF apparatus when the hello session table has been aged.

9. A system for keeping a session table alive in a Network Address Translation, NAT, apparatus, comprising:
an Access Border Gateway Function, A_BGF, apparatus, the A_BGF apparatus comprises a processor coupled to a memory, the A_BGF apparatus is adapted to
receive a command for keeping a session table alive from a proxy call session control function (P_CSCF); create a hello session table according to the command; create a hello message according to the hello session table, and send the hello message to the NAT apparatus; and
the NAT apparatus comprises a processor coupled to a memory, the NAT apparatus is adapted to receive the hello message and update a session table corresponding to the hello message.

10. The system of claim 9, wherein the A_BGF apparatus further adapted to periodically update the hello session table.

11. The system of claim 9, wherein the A_BGF apparatus further adapted to periodically send the hello message.

12. An Access Border Gateway Function (A_BGF) apparatus, comprising:
a processor coupled to a memory, wherein the processor is configured to:
receive a command for keeping a session table alive from a proxy call session control function (P_CSCF) by the A_BGF apparatus;
create a hello session table by the A_BGF apparatus according to the command;
create a hello message by the A_BGF apparatus according to the hello session table;
send the hello message by the A_BGF apparatus to a NAT apparatus.

13. The apparatus according to claim 12, wherein the processor is configured to:
create a key for keeping the session table alive by modifying a source port number in an existing key value;
create the hello session table according to the key for keeping the session table alive, wherein a downlink apparatus address in the hello session table is the same as a downlink apparatus address in the session table corresponding to the existing key value.

14. The apparatus according to claim 12, wherein the processor is configured to periodically send the hello message to the NAT apparatus.

15. The apparatus according to claim 12, wherein the processor is further configured to periodically refresh the hello session table and erase the hello session table when the hello session table has been aged.

* * * * *